United States Patent [19]

Harms, II

[11] Patent Number: 4,559,138
[45] Date of Patent: Dec. 17, 1985

[54] END CONNECTED FILTER CARTRIDGES

[75] Inventor: John F. Harms, II, West Palm Beach, Fla.

[73] Assignee: Harmsco, Inc., North Palm Beach, Fla.

[21] Appl. No.: 538,143

[22] Filed: Oct. 3, 1983

[51] Int. Cl.[4] ............................................. B01D 25/02
[52] U.S. Cl. .................................... 210/316; 210/330; 210/416.1; 210/450; 210/493.1; 55/484; 55/502
[58] Field of Search .................. 210/323.1, 323.2, 437, 210/457, 493.2, 493.1, 493.5, DIG. 13, 330, 335, 340, 494.1, 416.1, 450, 316, 456; 55/484, 490, 502

[56] References Cited

U.S. PATENT DOCUMENTS

| | | | |
|---|---|---|---|
| 95,614 | 10/1869 | Spear | 138/47 |
| 565,890 | 8/1896 | Fowler | 138/47 |
| 1,680,080 | 8/1928 | Benzion | 138/47 |
| 1,928,049 | 9/1933 | Danills | 210/169 |
| 2,098,725 | 11/1937 | Hurn | 210/DIG. 13 |
| 2,173,978 | 9/1939 | Pennebaker | 210/183 |
| 2,181,608 | 11/1939 | Russell et al. | 210/134 |
| 2,265,550 | 12/1941 | Smith | 210/335 |
| 2,313,307 | 3/1943 | Wilkinson | 210/323.1 |
| 2,413,991 | 1/1947 | Newman | 210/169 |
| 2,582,388 | 1/1952 | Mansfield | 210/266 |
| 2,699,182 | 1/1955 | Baldridge, Jr. | 138/47 |
| 2,699,261 | 1/1955 | Britton et al. | 210/169 |
| 2,730,241 | 1/1956 | Thomas | 210/165 |
| 2,744,632 | 5/1956 | Gardes | 210/184 |
| 3,044,957 | 7/1962 | Dow et al. | 210/508 |
| 3,397,793 | 8/1968 | MacDonnell | 210/493.5 |
| 3,618,784 | 11/1971 | Hellmuth | 210/493.1 |
| 3,720,322 | 3/1973 | Harms | 210/238 |
| 3,870,636 | 3/1975 | Schettler | 210/335 |
| 4,032,688 | 6/1977 | Pall | 210/494.1 |
| 4,033,881 | 7/1977 | Pall | 210/493.2 |
| 4,058,463 | 11/1977 | Bartik | 210/493.1 |
| 4,154,688 | 5/1979 | Pall | 210/493.2 |
| 4,253,954 | 3/1981 | Midriff et al. | 210/493.1 |

Primary Examiner—Richard V. Fisher
Assistant Examiner—Wanda L. Millard
Attorney, Agent, or Firm—Hugh A. Kirk

[57] ABSTRACT

The disclosure concerns a hollow cylindrical filter cartridge composed of an annular pleated filter medium surrounding a central perforated plastic tube, the ends of which cartridge and tube are embedded into plastic annular discs for closing the ends of the pleats of the filter media and providing an internal centrally threaded socket adjacent the inside of said perforated tube, which socket has an inner integrally projecting shoulder. Continuous outwardly threaded plastic nipples having a length of slightly more than twice the depth of said sockets to their shoulders provide connections between adjacent axially aligned cartridges which are sealed together by the abutment of the ends of said nipples against said shoulders. A plastic internally threaded cap having a depth greater than half the length of said nipples, may be threaded on the outer end of a nipple extending from a cartridge for closing that end. This cap has its rim clamped against the plastic disc directly opposite the end of the perforated tube for sealing that end of the cartridge. The opposite end of the cartridge or series of cartridges from the cap may have its outwardly extending nipple connected to a vacuum or suction source directly or through an adaptor, which connection also may be a support for that end of the cartridge or series of cartridges. One or more of these cartridges, usually two or three, may be placed in liquids in tanks, pressure vessels, irrigation ditches or ponds for filtering liquids, preferably water, including filtering water for swimming pools.

7 Claims, 11 Drawing Figures

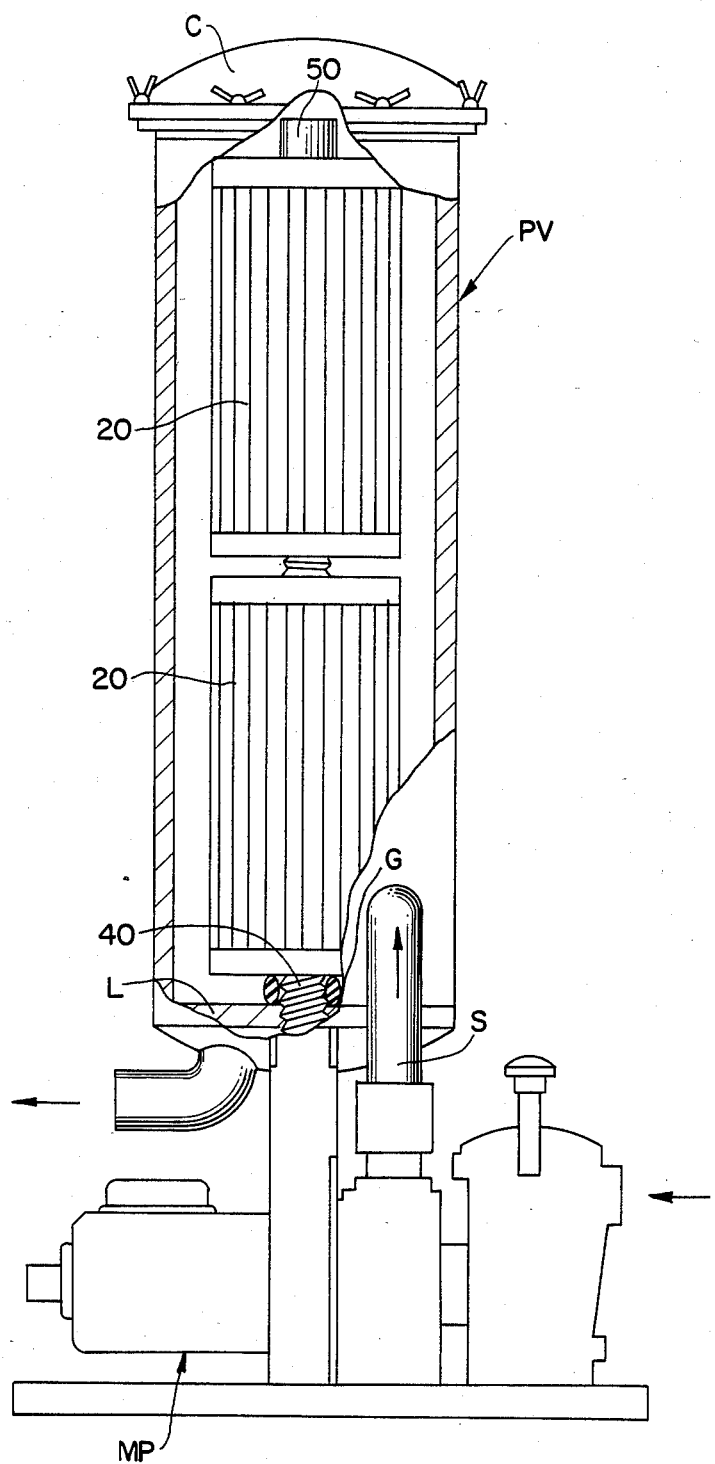
FIG. II

END CONNECTED FILTER CARTRIDGES

BACKGROUND OF THE INVENTION

Threaded nipples for connecting adjacent ends of filter cartridges are well known; however, such connections usually require special gaskets, supports and/or rigid sockets at the ends of the cartridges to prevent leakage at these connections, as well as to provide sufficient strength to withstand the vibrations produced from a pump. Furthermore, such connections are relatively expensive, and often difficult to assemble and disassemble for replacement and/or cleaning.

SUMMARY OF THE INVENTION

Generally speaking, the end connected filter cartridges of this invention each comprise a hollow cylindrical radially pleated filter medium, such as of a porous fabric sheet material, which pleats surround a durable plastic perforated tubular core of substantially the same length. Opposite ends of this filter medium and tube are simultaneously embedded and molded into an annular plastic disc with an internally threaded socket around the inside of each end of the perforated tube. This socket has an internal inwardly projecting tapered or bevelled shoulder flange, which bevel may be similar to the angles of the internal threads of the socket.

One of the important features of this invention is the discovery of a plastic for forming these end discs which is sufficiently pliable to seal the ends of the fabric filter media, and yet also sufficiently rigid to provide strong internal threads in its sockets for a more rigid connecting fitting or nipple. This plastic should have a Durometer at five seconds of about 54±4 and a tear strength ASTM D624 of about 440±40 lbs. per square inch, and a tensile strength ASTM D412 of about 3000±300 lbs. per square inch. This plastic, commonly known as a plastisol, comprises an organosol. The mold for forming this plastisol disc at the end of the filter medium is provided with an annular rib as a land to rest the ends of the filter medium pleats or to control the depth or thickness of the plastisol between the end of the filter medium and the end of the disc. This land forms a circular groove about halfway between the central socket of the disc and the periphery of the disc.

In order to connect adjacent cartridges with internally threaded sockets in their opposite axially aligned ends, there are provided externally threaded plastic nipples of a harder plastic material, such as of polyvinyl chloride (PVC), Nylon, Delron, etc., which nipple threads into the sockets and has a length of slightly more than twice the depth of the socket to its inner flange or shoulder, so that the ends of the nipple will seal against these shoulder flanges of adjacent cartridge sockets.

There is also provided a plastic cap, made of the same or similar plastic material as the nipple, for the nipple, which cap is internally threaded and has a depth slightly greater than half the length of the nipple, so that when it is threaded on the end of a cartridge projecting nipple to close that end of the cartridge, its rim edge will sealingly press against the plastisol plastic disc directly opposite the end of the perforated tube embedded in that disc. The outer cylindrical surface of the cap may be provided with a plurality of axially extending longitudinal radially outwardly projecting ribs for better manual gripping for assembly and disassembly of the caps.

The open end of the cartridge at the opposite end of one or more cartridges in a series, is threadedly connected either to a male fitting or a female fitting or special adaptor to an outlet or suction source, such as the intake of a pump, which connection also may be employed for supporting that end of the cartridge or cartridges, which cartridges may be supported either vertically in a column or horizontally in a tank, including laying on the bottom of a pool of liquid to be filtered.

Furthermore, since adjacent plastisol disc ends of cartridges in a series are not always abutting each other, there may be provided means for supporting the cartridges between adjacent cartridges as well as by the caps at the ends, particularly when the cartridges are submerged horizontally in a liquid to be filtered.

If the cartridges are used in a pressure vessel, they usually are supported and/or stacked vertically with the outlet of the series sealingly connected to a partition in the vessel such as by the nipple and/or an adaptor, and may be sealed and spaced from said partition by a gasket. The liquid to be filtered is then pumped into the vessel around the cartridges and the filtered liquid is collected on the opposite side of the partition from the cartridges in a chamber connected to an outlet duct. The pressure vessel is provided with a removable cover so that the cartridges may be replaced when needed.

OBJECTS AND ADVANTAGES

Accordingly, it is an object of this invention to produce a simple, efficient, effective, non-leaking, rigid, economic, lightweight, and easily assembled and disassembled filter cartridge and its connection.

Another object is to produce a filter cartridge in which the discs sealing the pleated filters at the end of the cartridge also integrally provide internally threaded sockets for nipples to connect these cartridges in series without the requirement of gaskets between them to prevent leakage.

Another object is to produce such a filter cartridge which when connected is sufficiently strong to prevent cracking and leaking due to vibrations in the fluid, particularly from a pump connected to the cartridge, or to the vessel in which the cartridge is located.

BRIEF DESCRIPTION OF THE VIEWS

The above mentioned and other features, objects and advantages, and a manner of attaining them are described more specifically below by reference to an embodiment of this invention shown in the accompanying drawings, wherein:

FIG. 11 is a schematic diagram of a pair of cartridges connected together in a column in a pressurized vessel, with most of the front side of the vessel being broken away.

DETAILED DESCRIPTION OF THE PREFERRED EMBODIMENT

A. Filter Cartridge

Figure 2:
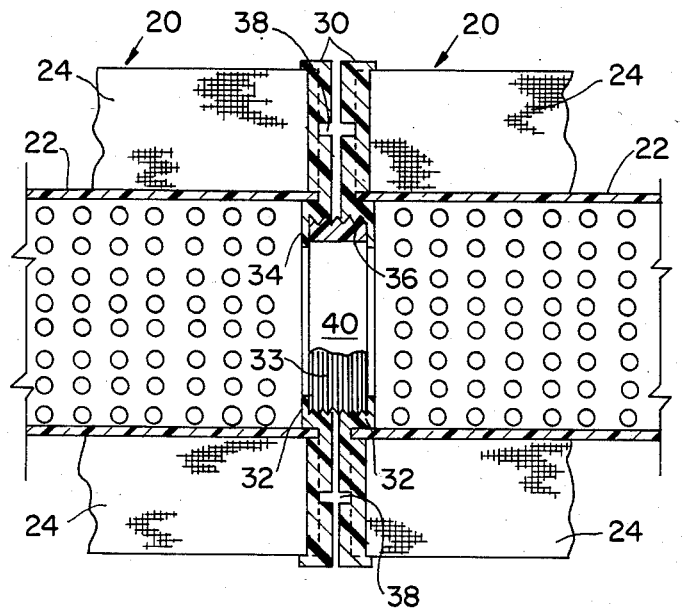
FIG. 2 is an enlarged sectional view of the connection between two cartridges as shown in the center of FIG. 1.
Figure 1:
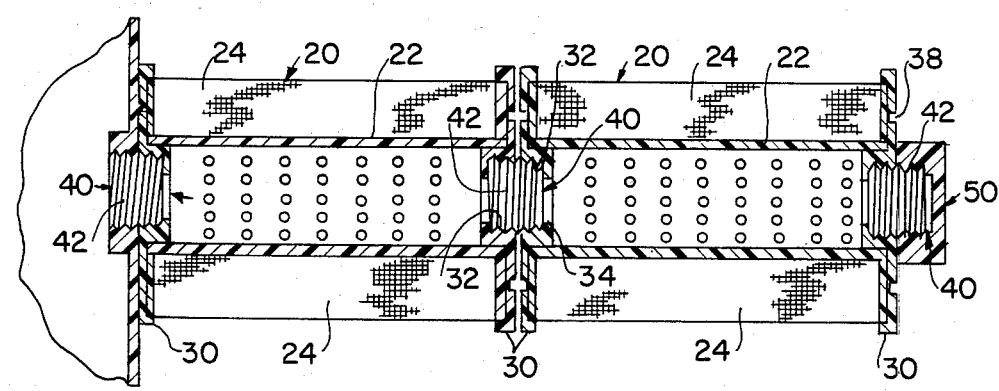
FIG. 1 is a longitudinal sectional view of a pair of cartridges and their connections according to a preferred embodiment of the present invention.
Figure 3:
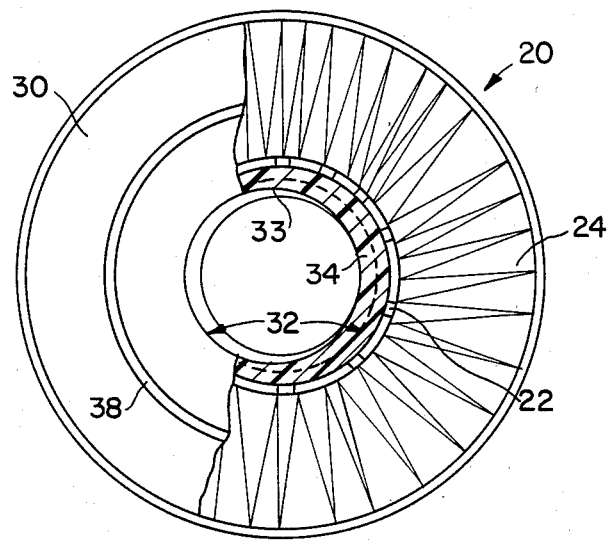
FIG. 3 is an enlarged end view of one of the cartridges shown in FIGS. 1 and 2 with part of the plastisol end disc broken away.

Referring first to FIGS. 1, 2 and 3, there are shown cylindrical filter cartridges 20, each comprising a central perforated durable plastic tube 22, such as of polyvinyl chloride, around which is wrapped a pleated porous sheet of filter medium 24 forming an annular cylindrical filter medium portion. The opposite ends of these tubes 22 and annular filter medium portions are embedded in a plastisol to form annular end discs 30, which plastisol discs seal the ends of the filter medium 24 with the adjacent ends of the perforated tubes 22 and also form central internally threaded sockets 32 for the connecting nipples 40. These plastisol end discs 30 are sufficiently soft to seal the ends of the fabric filter medium 24 without damaging the same, but also sufficiently rigid to form simultaneously therewith internally threaded sockets 32 with an inner end radially inwardly extending shoulder flange 34 which may have a bevelled inner surface 36, the angle of which bevel may be similar to that of the angle of the threads 33 in said socket 32. In order to gauge the thickness of the discs 30 and insure the complete embedding of the end of the cylindrical fabric filter medium 24 in the plastisol of the discs 30, there is provided in the mold for these discs 30 a circular rib or land to support the ends of the filter medium sufficiently above the bottom of the mold to insure their sufficient thickness. This rib produces the annular groove 38 in each plastisol disc 30 about halfway between the periphery of the socket 32 and outer periphery edge of the disc 30. The depth of the sockets 32 is greater than the thickness of the plastisol embedding the ends of the filter medium 24, and the outside of the sockets 32 are embedded and in contact with the ends of the perforated tubes 22.

B. Connecting Nipples

Figure 4:
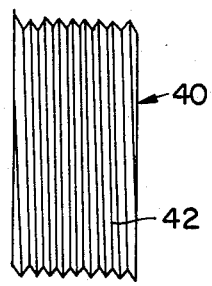
FIGS. 4 and 5 are enlarged side and end views, respectively, of the nipple shown threaded into the ends of the cartridges shown in FIGS. 1 and 2.
Figure 5:
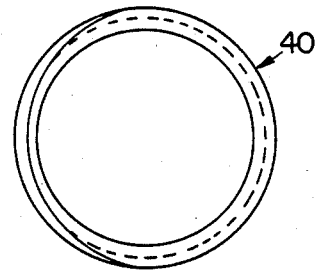

Referring now to FIGS. 1, 2, 4 and 5, there is disclosed the connecting nipples 40 which may be made of a durable plastic similar to that of the perforated tubes. These nipples may be cut sections from a standard polyvinyl chloride pipe and externally continuously threaded with threads 42 as shown in FIGS. 1 and 4. These nipples 40 are axially in length slightly greater than twice the depth of the socket 32 so that when they are connected or screwed into adjacent sockets of a pair of axially aligned cartridges, the opposite ends of the nipples will tightly seal against the inner bevelled shoulders 34 of the sockets 32. Thus there may be a slight spacing between adjacent ends of the plastisol discs 30 of the adjacent cartridges 20, and there is no reliable sealing between adjacent annular outer surfaces of the discs 30, which relative large areas would be very difficult to seal in any event. Accordingly, a much better, tighter and insured seal is obtained at the ends of the nipples 40 against the bevelled flanged shoulders 34 formed at the bottom of the sockets 32 of the plastisol ends 30 of each cartridge 20.

C. The Cap

Figure 6:
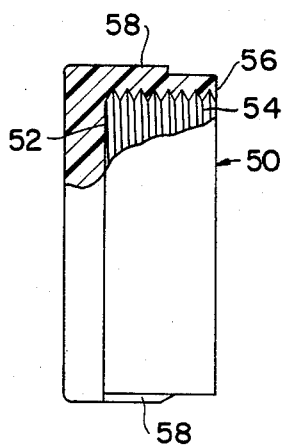
FIGS. 6 and 7 are enlarged side and end views, respectively, of the cap shown on the right end of the pair of cartridges shown in FIG. 1, with part of the cap broken away in FIG. 6.
Figure 7:
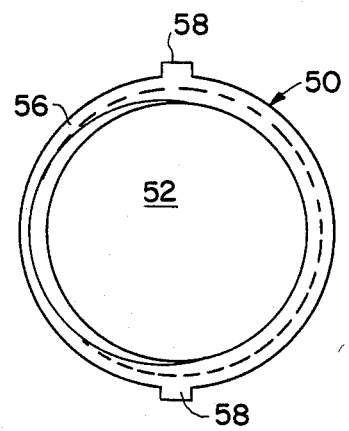

Since both ends of each cartridge 20 have open sockets 32, in order to have an effective filter, unless an outlet is connected to each end of the cartridge 20, there is preferably provided a cap 50 for one end, which cap 50 may be placed over the outwardly projecting half of a nipple 40. Such a cap 50 is shown in FIGS. 1, 6 and 7 and also is preferably made out of a durable plastic such as that of the tube 22 or nipple 40. This cap 50 has a socket portion 52 having internal threads 54 for screwing onto the exposed threads 42 of an outwardly extending nipple 40 at an open end of the cartridge to be closed. The seal of this cap 50 to the cartridge 20, however, is accomplished by providing the depth of the socket portion 52 in the cap deeper than half the length of the nipple 40 so that the threads 54 inside the socket 50 will permit the cap to have its peripheral edge 56 sealingly engage the outer surface of the plastisol disc 30 directly opposite the adjacent end of the perforated tube 22, to make a good seal between this edge 56 and the outer surface of the plastisol 30 adjacent the periphery of the nipple 40.

Furthermore, the outside of the cap 50 may be provided with a plurality, or at least a diametrically opposite pair, of axially extending and outwardly radially projecting ribs 58 to increase the friction of the outside of the cap for easy manual assembly and disassembly thereof.

D. Some Uses of These Cartridges

Figure 8:
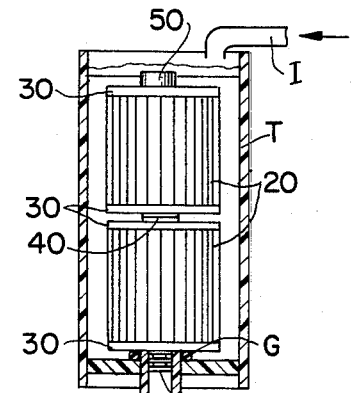
FIG. 8 is a schematic diagram of how a pair of cartridges may be connected together in a column for placing in a vessel for filtering a liquid introduced therein, with the front half of the vessel broken away.

Referring now to FIGS. 8 through 11, there are shown a plurality of filters according to the embodiment shown in FIGS. 1 and 2 connected together in different ways for different uses, although a single cartridge with a nipple 40 and cap 50 also may be used. In FIG. 8 a pair of vertically stacked cartridges are shown in a tank T having a liquid inlet duct I and a bottom outlet duct O, which outlet duct O is connected to the suction or vacuum side of a pump P. Herein a nipple 40 on the lower open end of the pair of filter cartridges 20 is directly screwed into the internally threaded hole in communication with the bottom outlet duct O and may be sealed therein by a gasket G.

Figure 9:
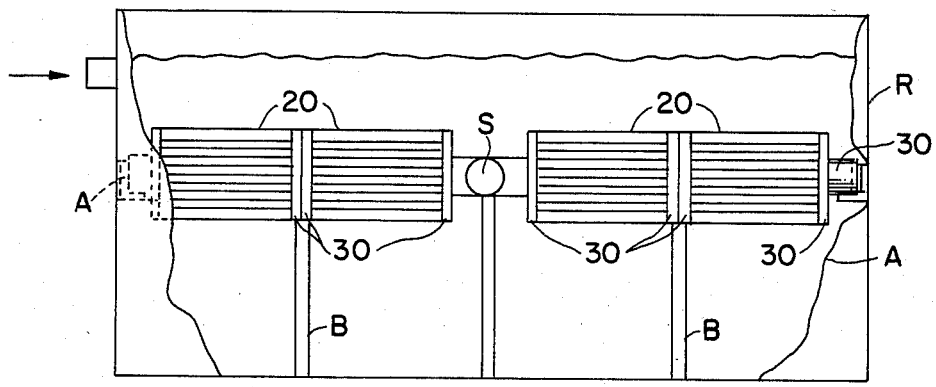
FIG. 9 is a schematic view of a rectangular surge tank or cistern filled with water in which pairs of filter cartridges according to this invention are submerged, horizontally supported, and connected to a common suction duct, with the front wall of the vessel partly broken away.

In FIG. 9 there are pairs of cartridges 20 supported in a rectangular reservoir or vessel R, such as by angle brackets A for the caps 50 and support brackets B intermediate the pairs of cartridges. These pairs of cartridges may then be connected to a vacuum source S, which also supports those ends of the cartridge pairs. Such a vessel R is often employed as a surge tank for water in circulating water through swimming pools.

Figure 10:
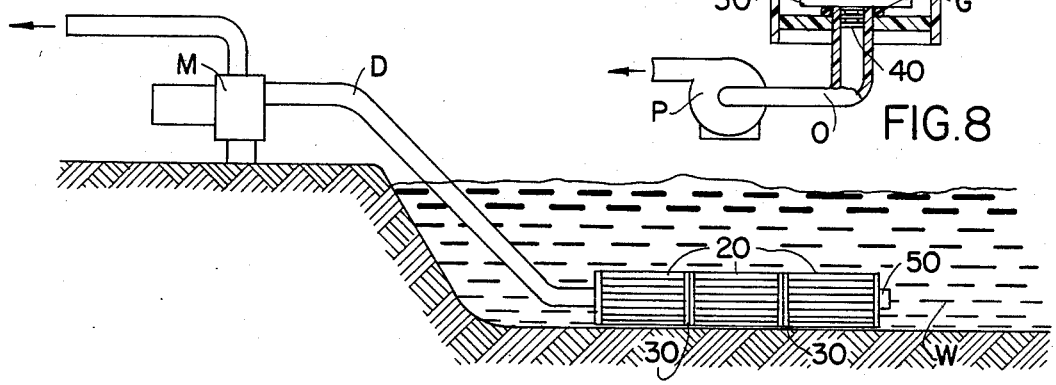
FIG. 10 is a schematic diagram of a series of filter cartridges according to this invention lying on the bottom of a pool of water, one end of which series is connected to the intake of a pump.

In FIG. 10 there is shown a pool of water W, such as a pond or irrigation ditch in which a plurality of the filter cartridges 20 are laid on the bottom thereof. The one open end of this series of these cartridges is connected directly to an input duct D of a motor-driven pump M, thus filtering the water from the pool W before it is used or discharged from the pump M.

Referring to FIG. 11 there is shown a pressure vessel PV mounted on top of a motor pump MP. There are shown in this vessel PV two filter cartridges 20 similar to those shown in FIGS. 1 and 8, the lower one of which is connected by a nipple 40 to the bottom partition L in the pressure vessel PV, which connection may include a gasket G. The pressure outlet 5 from the pump MP is connected into the side of the vessel PV so the liquid to be filtered can circulate around the outside of the two stacked cartridges 20. The nipple on top of the upper cartridge 20 has screwed thereon the cap 50 which may extend up into the removable domed cover C of the pressure vessel PV. This cover C can be removed for easy access to the cartridges for their removal, cleaning and/or replacement.

Thus the cartridges 20 and their connectors 40 according to this invention may be used for differential pressures, that is both increased and reduced pressure from their outsides or from their insides.

Although there is disclosed only connecting two or three cartridges together in series, it is to be clearly understood that more than two or three cartridges can be connected in series, if desired; however, if too many cartridges are so connected, the amount of suction or filtering action which can occur at the most remote cartridge is materially reduced the farther it is away from the vacuum or reduced pressure source connected to the opposite end of the series.

It also should be understood that the types of plastic employed for the parts of the cartridges may be varied in composition, provided they have physical properties similar to those above described.

While there is described above the principles of this invention in connection with a specific apparatus, it is to be clearly understood that this description is made only by way of example and not as a limitation to the scope of this invention.

I claim:
1. A filter cartridge and connection comprising:
(A) a perforated central tube,
(B) an annular filter medium comprising a continuous pleated sheet material surrounding said tube throughout its length,
(C) parallel end discs, one embedding each end of said tube and filter medium and having a central internally threaded open socket of a given depth with an internal radially inwardly extending flange at the innermost end of said socket, and
(D) a continuous externally threaded nipple slightly longer than twice the depth of said socket and screwed into said socket so that the end of said nipple seals against said flange.

2. A filter cartridge according to claim 1 including an internally threaded cap having a socket depth more than half the length of said nipple for closing an end of said cartridge by being threaded onto the exposed end of said nipple, the rim of said cap sealing against said disc directly opposite the end of said perforated central tube.

3. A plurality of filter cartridges according to claim 2 connected in series by said nipples, one end of said series being closed with said cap and the other end of said series being connected to an outlet duct, said plurality of cartridges being submerged in a liquid to be filtered.

4. A plurality of filter cartridges according to claim 3 wherein said outlet duct is a suction source.

5. A filter cartridge according to claim 2 wherein said cap has a plurality of radially outwardly axially extending ribs.

6. A filter cartridge according to claim 2 wherein said tube, nipple and cap are made of polyvinyl chloride plastic.

7. A filter cartridge according to claim 1 wherein said discs comprise a plastisol.

* * * * *